US008472934B2

(12) United States Patent
Hering

(10) Patent No.: US 8,472,934 B2
(45) Date of Patent: Jun. 25, 2013

(54) PORTABLE APPARATUS, METHOD AND USER INTERFACE

(75) Inventor: Jean-Marc Hering, Naantali (FI)

(73) Assignee: Nokia Corporation, Espoo (FI)

( * ) Notice: Subject to any disclaimer, the term of this patent is extended or adjusted under 35 U.S.C. 154(b) by 1262 days.

(21) Appl. No.: 11/946,373

(22) Filed: Nov. 28, 2007

(65) Prior Publication Data

US 2009/0137236 A1  May 28, 2009

(51) Int. Cl.
*H04M 3/00* (2006.01)
(52) U.S. Cl.
USPC .......... 455/418; 455/3.04; 455/564; 455/558; 455/466; 455/550; 455/566; 455/414.1; 455/411
(58) Field of Classification Search
CPC ........... H04W 1/72522; H04W 1/72583; G06F 3/04883
USPC ............... 455/566, 418, 550.1, 556.1, 456.2, 455/466, 214, 2.01, 419, 412.2, 567, 445, 455/553.1; 370/338, 329, 252, 389, 346, 370/315, 464, 328; 379/220.01; 709/206; 718/108; 707/101
See application file for complete search history.

(56) References Cited

U.S. PATENT DOCUMENTS

| 6,871,217 | B2 * | 3/2005 | Voticky et al. ................ 709/207 |
| 7,429,988 | B2 * | 9/2008 | Gonsalves et al. ........... 345/472 |
| 7,693,509 | B2 * | 4/2010 | Miyata ....................... 455/414.1 |
| 7,801,099 | B2 * | 9/2010 | Desai ........................... 370/338 |
| 7,873,153 | B2 * | 1/2011 | Bukovec et al. ......... 379/220.01 |
| 2005/0025876 | A1* | 1/2005 | Asai et al. ........................ 710/1 |
| 2005/0055406 | A1* | 3/2005 | Singhai et al. ............... 709/206 |
| 2007/0042801 | A1* | 2/2007 | Miyata ....................... 455/550.1 |
| 2007/0043574 | A1* | 2/2007 | Coffman et al. ............. 704/275 |
| 2007/0089136 | A1* | 4/2007 | Kumai et al. ................... 725/46 |
| 2007/0106991 | A1* | 5/2007 | Yoo ............................... 718/103 |
| 2007/0157209 | A1* | 7/2007 | Hashimoto et al. .......... 718/104 |
| 2007/0275757 | A1* | 11/2007 | Yoo et al. ..................... 455/557 |
| 2008/0040368 | A1* | 2/2008 | Li et al. ......................... 707/101 |
| 2008/0091851 | A1* | 4/2008 | Sierra ............................ 710/22 |
| 2008/0178186 | A1* | 7/2008 | Capek et al. ................. 718/103 |
| 2008/0235693 | A1* | 9/2008 | Proctor et al. ............... 718/103 |
| 2008/0268828 | A1* | 10/2008 | Nagaraja ...................... 455/419 |
| 2008/0279138 | A1* | 11/2008 | Gonikberg et al. .......... 370/328 |
| 2009/0215461 | A1* | 8/2009 | Kim .............................. 455/445 |

* cited by examiner

*Primary Examiner* — Joseph Arevalo
(74) *Attorney, Agent, or Firm* — Alston & Bird LLP

(57) ABSTRACT

A method for handling a plurality of processes running on a portable apparatus including: receiving a first user input and in response to the first user input suspending a subset of the plurality of processes. Corresponding portable apparatus, computer program product and user interface are also presented.

13 Claims, 4 Drawing Sheets

PORTABLE APPARATUS, METHOD AND USER INTERFACE

FIELD

The disclosed embodiments relate to a method for handling a plurality of processes running on a portable apparatus. It further relates to a portable apparatus on which the method is implemented, and a user interface implementing the method on said portable apparatus.

BACKGROUND

Portable apparatuses are designed and built with a limited amount of processor, memory and other hardware resources. During operation, the processor of the portable apparatus executes one or more program applications along with the operating system (OS). Most currently available portable apparatuses enable overlapping execution of multiple applications, tasks, services and processes. These processes each utilize a portion of the available resources of the portable apparatus and typically operate independently of all other processes running on the portable apparatus, i.e. they can be started and stopped without affecting other processes. The larger the number of processes that are executed in parallel, the more available processing power for each individual process is reduced. This results in slower process execution and delays in portable apparatus response.

One way to cope with the drawbacks of this delayed response is for a user to be distracted by another process that has already been executed while waiting for the execution of the desired process. However, this solution is not always satisfactory. The solution is, for example, not adequate in urgent matters where immediate action is required.

Consequently, there is a need to provide an improved and reliable way of decreasing, and preferably eliminating, the system response time.

SUMMARY

In view of the above, it would be advantageous to solve or at least reduce the problems discussed above.

According to a first aspect there has been provided a method for a portable apparatus comprising:

receiving a first user input and in response to the first user input;

suspending a subset of said plurality of processes.

Hence, a user is enabled to enhance the performance of one or more processes at the detriment of other processes by requesting the system to reallocate its processing power to one or more processes whose accelerated completion is desired. For instance, it may be possible to allocate essentially all processing power to only one process. There is therefore no need to lose time and wait for portable apparatus' response in for instance urgent matters where immediate user action may be required.

According to one embodiment, each process may be associated with an execution priority and the suspending of the at least one of the processes may involve considering the execution priority and only suspending processes below a predetermined level of execution priority.

According to another embodiment, the first user input may be representative of a selection of at least one desired process from said plurality of running processes, and wherein said subset comprises at least one of the remaining processes from the plurality of running processes. Hence, suspension of a subset of processes may be initiated directly, without requiring a preceding selection of process or processes to be boosted.

According to a further embodiment, the response to the first user input may comprise displaying a list of running processes and further comprising:

receiving a second user input and in response to the second user input displaying a selection indicator corresponding to at least one process in the displayed list;

receiving a third user input and in response to the third user input;

suspending at least one of the processes not having a corresponding selection indicator.

Hence, user is enabled to actively choose from all listed and available processes. As an advantage, more user control is achieved.

Any of the first, second and third user input may be received via any of a key, jog dial, joystick, touch sensitive display or any combination thereof. Any of the first, second, third user input may also be received via a microphone. In one particular embodiment, the user input governing the suspension of one group of processes in favor of another group of processes is controlled by a designated key, such as a hardware button or soft key.

According to another embodiment, the at least one desired process may be the most recently initiated process. Hence, the newest process is boosted on behalf of other, already running processes. As an advantage, selection of the most recently initiated process is made particularly convenient.

A second aspect of the disclosed embodiments is a portable apparatus comprising: a controller, a memory, a display and a user input circuitry, wherein the apparatus is configured to perform the method according to the first aspect.

The portable apparatus may be selected from the group comprising a mobile communication terminal, a digital media player, a pocket computer, cellular telephone and a digital camera.

A third aspect of the disclosed embodiments is a portable apparatus comprising means that, when said means are implemented in a portable apparatus, performs the method according to the first aspect.

A fourth aspect of the disclosed embodiments is a computer program product comprising software instructions that, when executed in a portable apparatus, performs the method according to the first aspect.

A fifth aspect of the disclosed embodiments is a user interface comprising an output device wherein the output device is arranged to visualize phases of the method according to the first aspect.

Most current portable apparatuses enable overlapping execution of multiple applications, tasks, services and processes, typically collectively referred to as processes. A process is to be construed as a set of instructions executed by a processor, such as background services or applications. The plurality of active processes may be executed concurrently in an operating system, even with only one central processing unit (CPU). The processes may be concurrently active within the meaning that the processing power of one or more processors may be divided and distributed among these processes, providing fictive multi-tasking. The processing time for each processor may then be distributed among the active processes. In a case with multiple processors, each of the processes may at any time be processed undivided on any one of the available processors.

Suspension of a process is to be construed as reducing process power for that process, for instance by providing less processing time.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects of the disclosed embodiments will now be described in more detail, reference being made to the enclosed drawings, in which.

DETAILED DESCRIPTION OF EMBODIMENTS

The disclosed embodiments will now be described more fully hereinafter with reference to the accompanying drawings, in which certain embodiments are shown. The disclosed embodiments may, however, be embodied in many different forms and should not be construed as limited to the embodiments set forth herein; rather, these embodiments are provided by way of example so that this disclosure will be thorough and complete, and will fully convey the scope of the disclosed embodiments to those skilled in the art. Like numbers refer to like elements throughout.

Figure 1:
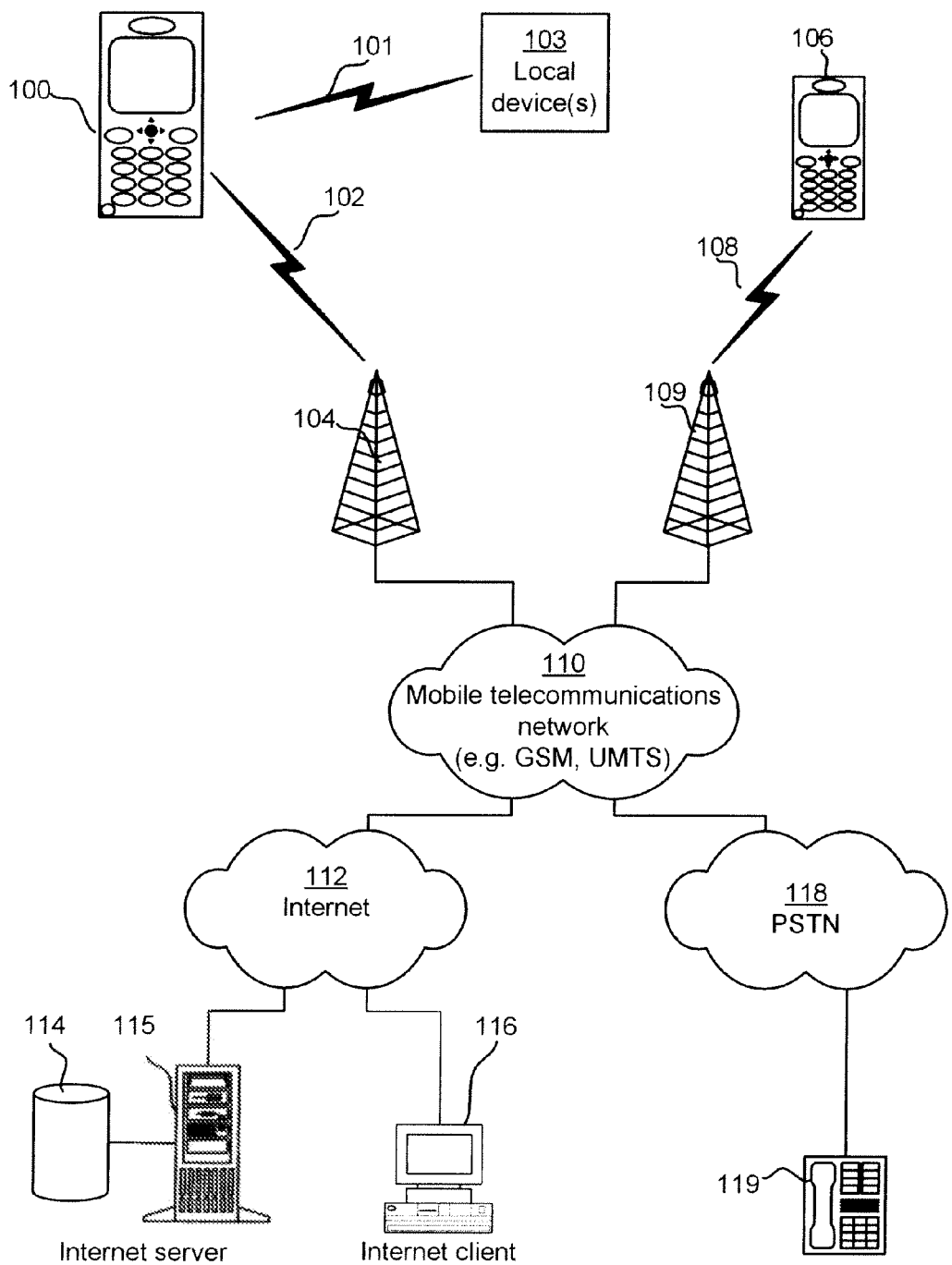
FIG. 1 is a schematic illustration of a cellular telecommunication system, as an example of an environment in which the disclosed embodiments may be applied.

FIG. 1 illustrates an example of a cellular telecommunications system in which the disclosed embodiments may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the disclosed embodiments and other devices, such as another mobile terminal 106 or a stationary telephone 119. It is to be noted that for different embodiments of the mobile terminal 100 and in different situations, different ones of the telecommunications services referred to above may or may not be available; the disclosed embodiments are not limited to any particular set of services in this respect.

The mobile terminals 100,106 are connected to a mobile telecommunications network 110 through RF links 102,108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 112, which may be Internet or a part thereof. An Internet server 115 has a data storage 114 and is connected to the wide area network 112, as is an Internet client computer 116. The server 115 may host a www/wap server capable of serving www/wap content to the mobile terminal 100.

A public switched telephone network (PSTN) 118 is connected to the mobile telecommunications network 110 in a familiar manner. Various telephone terminals, including the stationary telephone 119, are connected to the PSTN 118.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, etc.

Figure 2:
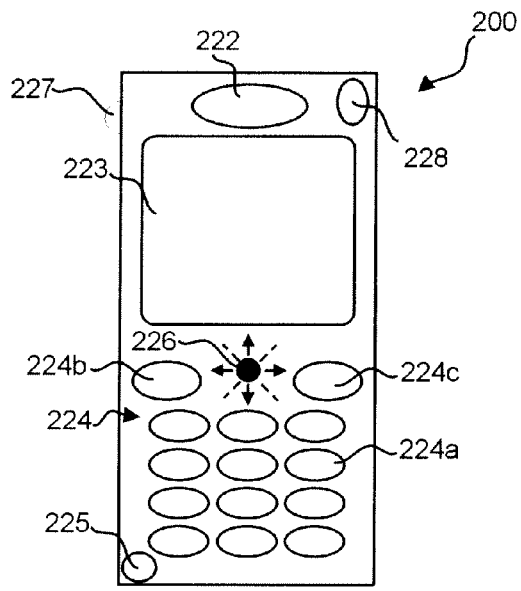
FIG. 2 is a schematic front view illustrating a mobile communication terminal according to an embodiment.

An embodiment 200 of the mobile terminal 100 is illustrated in more detail in FIG. 2. The mobile terminal 200 comprises a speaker or earphone 222, a microphone 225, a display 223 and a set of keys 224 which may include a key-pad 224a of common ITU-T type (alpha-numerical keypad representing characters "0"-"9", "*" and "#") and certain other keys such as soft keys 224b, 224c and a joystick 226 or other type of navigational input device. The mobile terminal 200 may further comprise a boost key 228 for suspending processes to boost the performance of a desired process or set of processes. The boost key may also be implemented as a soft key.

Figure 3:
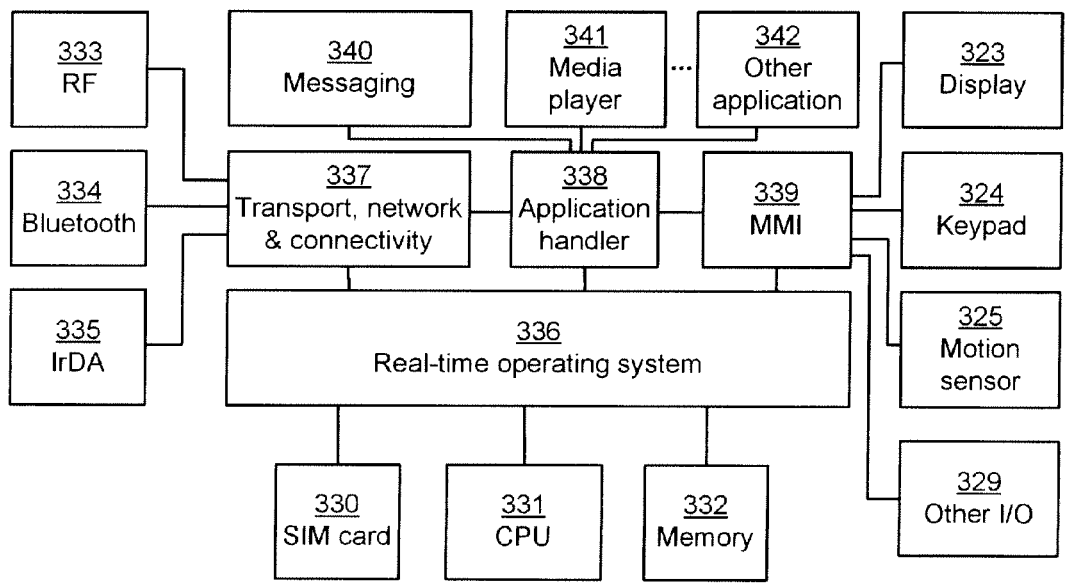
FIG. 3 is a schematic block diagram representing an internal component, software and protocol structure of the mobile communication terminal shown in FIG. 2.

The internal component, software and protocol structure of the mobile terminal 200 will now be described with reference to FIG. 3. The mobile terminal has a controller 331 which is responsible for the overall operation of the mobile terminal and is preferably implemented by any commercially available CPU ("Central Processing Unit"), DSP ("Digital Signal Processor") or any other electronic programmable logic device. The controller 331 has associated electronic memory 332 such as RAM memory, ROM memory, EEPROM memory, flash memory, or any combination thereof. The memory 332 is used for various purposes by the controller 331, one of them being for storing data and program instructions for various software in the mobile terminal. The software includes a real-time operating system 336, drivers for a man-machine interface (MMI) 339, an application handler 338 as well as various applications. The applications can include a messaging application 340 for sending and receiving SMS, MMS or email, a media player application 341, as well as various other applications 342, such as applications for voice calling, video calling, web browsing, an instant messaging application, a phone book application, a calendar application, a control panel application, a camera application, one or more video games, a notepad application, etc.

The MMI 339 also includes one or more hardware controllers, which together with the MMI drivers cooperate with the display 323/223, keypad 324/224 including an application boost activation key, motion sensor 325, such as an accelerometer, as well as various other I/O devices 329 such as microphone, speaker, vibrator, ring tone generator, LED indicator, etc. As is commonly known, the user may operate the mobile terminal through the man-machine interface thus formed.

The software also includes various modules, protocol stacks, drivers, etc., which are commonly designated as 337 and which provide communication services (such as transport, network and connectivity) for an RF interface 333, and optionally a Bluetooth interface 334 and/or an IrDA interface 335 for local connectivity. The RF interface 333 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, i.a., band pass filters, amplifiers, mixers, local oscillators, low pass filters, AD/DA converters, etc.

The mobile terminal also has a SIM card 330 and an associated reader. As is commonly known, the SIM card 330 comprises a processor as well as local work and data memory.

Figure 4:
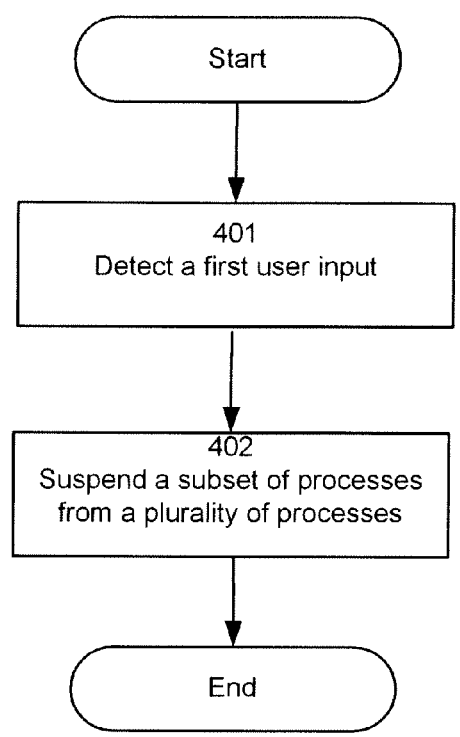
FIG. 4 is a flow chart illustrating a method of one embodiment, said method being performed in the portable apparatus of FIG. 2.

FIG. 4 is a flow chart illustrating a method for enhancing the performance of at least one process, said method being performed in the portable apparatus of FIG. 2. At least one running process may be implicitly selected i.e. the selected process is the one that currently appears in the foreground of the display. Upon receipt of a first user input 401, such as pressing a designated key or a soft key, a subset of processes from a set of running processes is temporarily suspended 402, whereby more processing capacity is allocated to the implicitly selected process whose performance is desired to be enhanced. The subset of processes origin from a set of running processes, and constitute the remaining processes, which are being down prioritized to free processing power.

Figure 5:
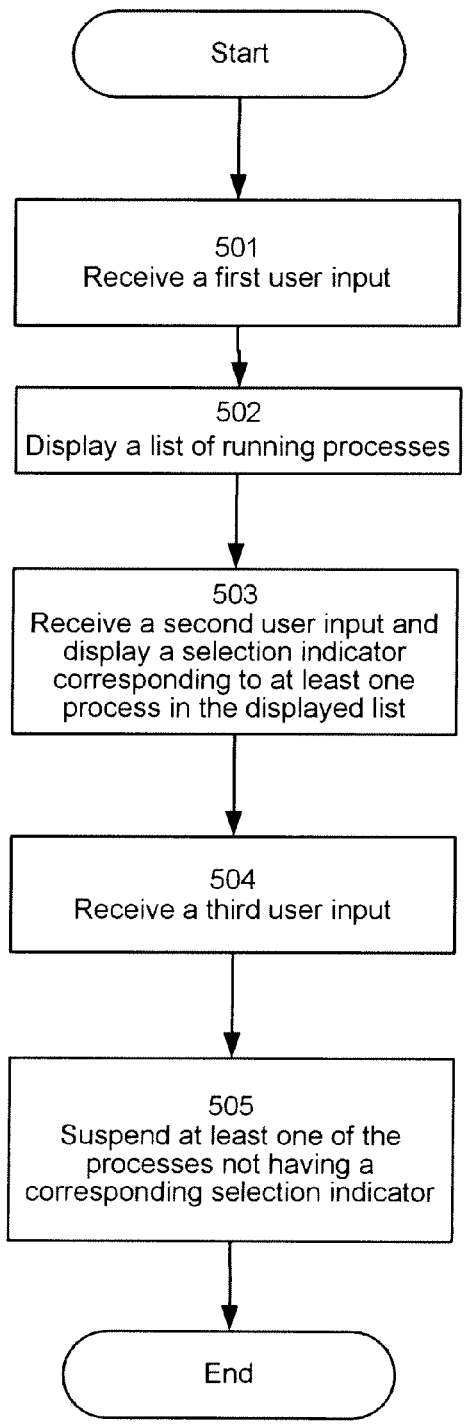
FIG. 5 is a flow chart illustrating a method of another embodiment, said method being performed in the portable apparatus of FIG. 2.

FIG. 5 is a flow chart illustrating an alternative method according to the disclosed embodiments, also performed in the portable apparatus of FIG. 2. Upon receipt of a first user input 501, such as pressing a key or a soft key, a list of running processes is displayed 502. Upon receipt of a second user input 503 a selection indicator corresponding to a selected process in the displayed list is displayed. One or more running processes may now be explicitly selected. Upon receipt of a third user input 504 at least one of the processes not having a corresponding selection indicator is suspended 505, whereby more processing capacity is allocated to the selected process whose performance is desired to be enhanced.

Although the disclosed embodiments have above been described using an embodiment in a mobile communication terminal, the disclosed embodiments are applicable to any type of portable apparatus, including portable mp3-players, cameras, pocket computers etc.

The disclosed embodiments have mainly been described above with reference to a few embodiments. However, as is readily appreciated by a person skilled in the art, other embodiments than the ones disclosed above are equally possible within the scope of the disclosed embodiments, as defined by the appended patent claims.

What is claimed is:

1. A method comprising:
enabling running simultaneously of a plurality of processes, each of the plurality of processes using an associated portion of available resources;
in response to receiving a first user input, enabling displaying of a list of running processes;
in response to receiving a second user input corresponding to selecting a displayed icon, enabling displaying of a selection indicator corresponding to at least one running process in the displayed list;
categorising each of the running plurality of processes either as a desired process or as an undesired process based on the second user input received;
in response to receiving a third user input, enabling temporary suspending of the at least one undesired process; and
enabling reallocating resources from the temporary suspended at least one undesired process to the at least one desired process.

2. The method according to claim 1, wherein each process is associated with an execution priority and wherein said temporarily suspending involves considering the execution priority and only temporarily suspending processes below a predetermined level of execution priority.

3. The method according to claim 1, wherein the first user input is representative of a selection of at least one desired process from said plurality of running processes, and wherein said at least one undesired process comprises at least one of the remaining processes from the plurality of running processes.

4. The method according to claim 3, wherein said at least one desired process is the most recently initiated process.

5. The method according to claim 1, wherein any user input is received via any of a key, jog dial, joystick, touch sensitive display, microphone or any combination thereof.

6. A portable apparatus comprising:
a controller, memory, display and user input circuitry, wherein said apparatus is configured to perform the method according to claim 1.

7. The portable apparatus according to claim 6, wherein said portable apparatus is selected from the group consisting of a mobile communication terminal, a digital media player, a pocket computer and a digital camera.

8. A portable apparatus comprising:
means for performing the method according to claim 1.

9. A computer program product embodied in a memory of a portable apparatus comprising software instructions that, when executed in a portable apparatus, performs the method according to claim 1.

10. A user interface comprising:
an output device, wherein said user interface is arranged to:
visualize phases of the method according to claim 1.

11. The method according to claim 1, wherein a said process comprises one or more of:
providing a telecommunication service, providing a cellular voice call, providing a data call, providing a World Wide Web service, providing a Wireless Application Protocol service, providing a cellular video call, providing a data call, transmitting a facsimile, transmitting music, transmitting a still image, transmitting a video, and enabling electronic commerce.

12. An apparatus comprising:
at least one controller; and
at least one memory including computer program code,
the at least one memory and the computer program code configured to, with the at least one controller, cause the apparatus to perform at least the following:
enable running simultaneously a plurality of processes, each of the plurality of processes using an associated portion of available resources;
in response to receiving a first user input, enable displaying of a list of running processes;
in response to receiving a second user input corresponding to selecting a displayed icon, enable displaying of a selection indicator corresponding to at least one running process in the displayed list;
categorise each of the running plurality of processes either as a desired process or as an undesired process based on the second user input received;

in response to receiving a third user input, enable temporary suspending of the at least one undesired process; and enable reallocating of resources from the temporary suspended at least one undesired process to the at least one desired process.

13. A computer program product stored in a non-transitory medium, the computer program product configured to:

enable running simultaneously a plurality of processes, each of the plurality of processes using an associated portion of available resources;

in response to receiving a first user input, enabling displaying of a list of running processes;

in response to receiving a second user input corresponding to selecting a displayed icon, enable displaying of a selection indicator corresponding to at least one running process in the displayed list;

enable categorising each of the running plurality of processes either as a desired process or as an undesired process based on the second user input received;

in response to receiving a third user input, enable temporary suspending of the at least one undesired process; and enable reallocating of resources from the temporarily suspended at least one undesired process to the at least one desired process.

* * * * *

UNITED STATES PATENT AND TRADEMARK OFFICE
CERTIFICATE OF CORRECTION

PATENT NO. : 8,472,934 B2
APPLICATION NO. : 11/946373
DATED : June 25, 2013
INVENTOR(S) : Hering It is certified that error appears in the above-identified patent and that said Letters Patent is hereby corrected as shown below:

In the Claims:

Column 5,
Line 55, "A method comprising:" should read --A method, the method comprising:--.

Column 6,
Line 4, "enabling reallocating resources from the temporary" should read --enabling reallocating of resources from the temporarily--.

Signed and Sealed this
Eighth Day of October, 2013

Teresa Stanek Rea
*Deputy Director of the United States Patent and Trademark Office*